(12) United States Patent
Cole et al.

(10) Patent No.: US 12,704,873 B2
(45) Date of Patent: Aug. 11, 2026

(54) CLEANING A TOUCH SCREEN

(71) Applicant: Diebold Nixdorf, Incorporated, Hudson, OH (US)

(72) Inventors: Robert M. Cole, New Franklin, OH (US); George L. Niemoeller, Canal Fulton, OH (US); Daniel Patrick Schoeffler, Twinsburg, OH (US); Todd Howard Christian, Dalton, OH (US); Nathaniel Adam Oberly, East Canton, OH (US); Uwe Krueger, Berlin (DE)

(73) Assignee: DIEBOLD NIXDORF, INCORPORATED, North Canton, OH (US)

( * ) Notice: Subject to any disclaimer, the term of this patent is extended or adjusted under 35 U.S.C. 154(b) by 122 days.

(21) Appl. No.: 18/425,608

(22) Filed: Jan. 29, 2024

(65) Prior Publication Data

US 2025/0244788 A1 Jul. 31, 2025

(51) Int. Cl.

| | |
|---|---|
| ***G06F 1/16*** | (2006.01) |
| ***G06F 3/041*** | (2006.01) |
| ***G07F 19/00*** | (2006.01) |

(52) U.S. Cl.

CPC .......... *G06F 1/1601* (2013.01); *G07F 19/205* (2013.01); *G06F 3/041* (2013.01)

(58) Field of Classification Search

CPC ....... G06F 1/1601; G06F 3/041; G07F 19/205

See application file for complete search history.

(56) References Cited

U.S. PATENT DOCUMENTS

| | | | | |
|---|---|---|---|---|
| 5,526,422 | A | 6/1996 | Keen | |
| 7,780,072 | B1 | 8/2010 | Lute | |
| 2007/0052690 | A1 | 3/2007 | Roberts | |
| 2011/0001712 | A1* | 1/2011 | Saito | G07G 1/01 345/173 |
| 2011/0011623 | A1 | 1/2011 | Hyde et al. | |
| 2011/0284025 | A1 | 11/2011 | Lemchen | |
| 2020/0238824 | A1* | 7/2020 | Park | B60K 35/654 |
| 2021/0034550 | A1 | 2/2021 | Kuzmack et al. | |
| 2024/0013999 | A1 | 1/2024 | Kimura et al. | |

OTHER PUBLICATIONS

International Search Report filed in the corresponding PCT Application No. PCT/US2025/013576 dated Mar. 12, 2025; 2 pages.

Written Opinion filed in the corresponding PCT Application No. PCT/US2025/013576 dated Mar. 12, 2025; 8 pages.

* cited by examiner

*Primary Examiner* — Laura A Gudorf

(74) *Attorney, Agent, or Firm* — Black McCuskey

(57) ABSTRACT

Described in an example embodiment herein is a technique for cleaning between a touch screen and a display that can be performed without the use of tools. The method comprises disengaging a latch coupling a display with a fascia having a a touch panel mounted thereon and rotating the display away from the fascia. The method further comprises cleaning either a rear surface of a touch panel, a display surface, or both the rear surface of the touch panel and the display surface.

20 Claims, 11 Drawing Sheets

CLEANING A TOUCH SCREEN

TECHNICAL FIELD

The present disclosure relates generally to terminals, such as automated banking machines, equipped with a touch screen

BACKGROUND

A touchscreen or touch screen is the assembly of both an input and output device. The touch panel is normally layered on the top of an electronic visual display of an electronic device. A user interacts with a touch-controlled appliance by using hand gestures and fingertip movements to tap pictures, moving elements or type words on the screen.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein a method for cleaning a touch screen display. The method comprises disengaging a latch coupling a display with a fascia having a a touch panel mounted thereon and rotating the display away from the fascia. The method further comprises cleaning a surface selected from a group consisting of a rear surface of a touch panel and a display surface;

In accordance with an example embodiment, there is disclosed herein an apparatus, comprising a housing that comprises a fascia, a touch panel display mounted on the fascia, a display coupled with the fascia, a latch that while engaged holds the display against the fascia, and a hinge rotatably coupling the display to the fascia. While the latch is disengaged, the display is rotatable away from the touch panel enabling access to a rear surface of the touch panel and a surface of the display.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Figure 1:
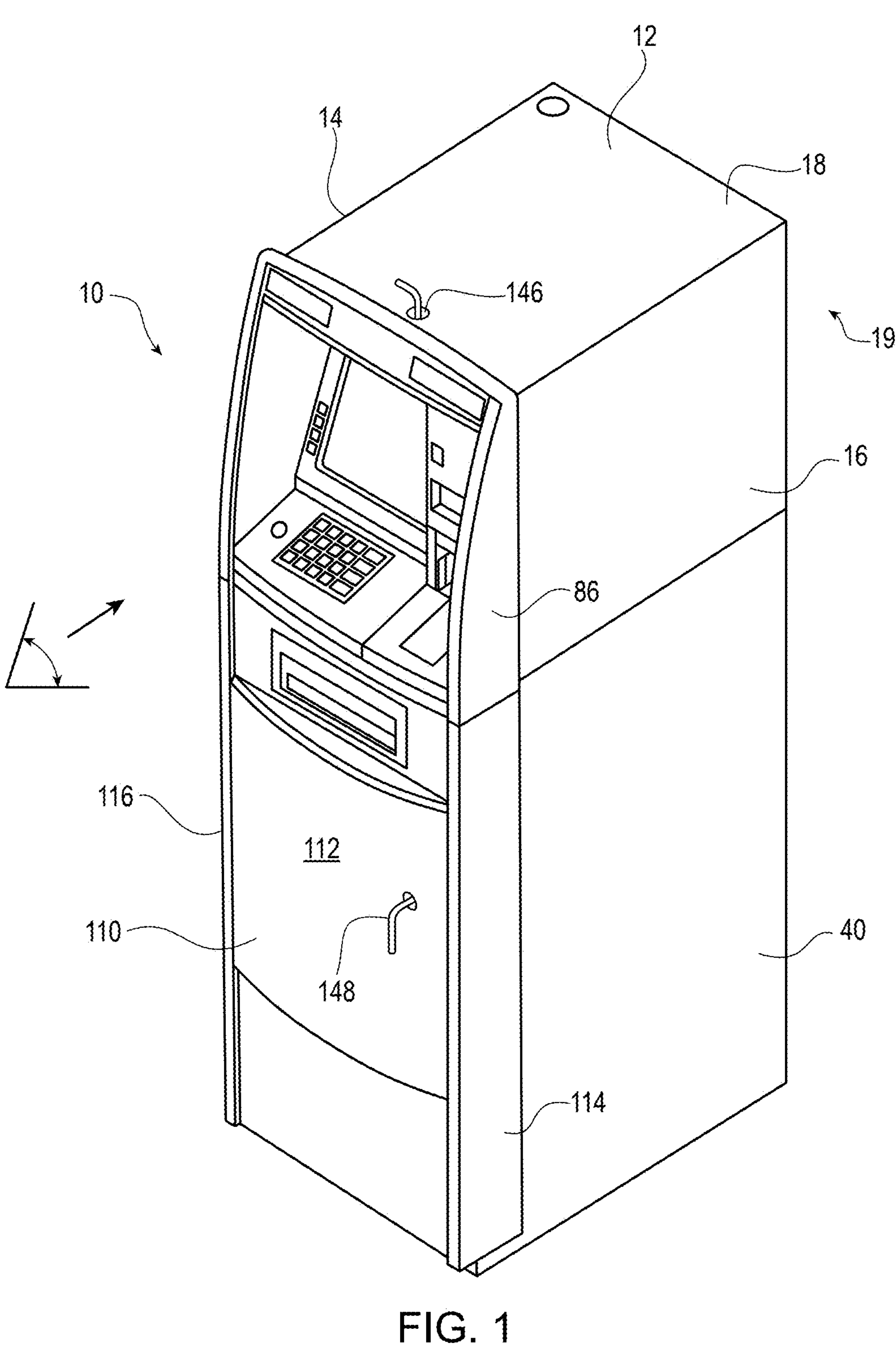
FIG. 1 is a perspective view of an automated banking machine upon which an example embodiment can be implemented.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described herein is a technique for cleaning the rear surface of a touch panel and a display coupled with a fascia of a devices, such as an automated banking machine, where access to the rear surface of the touch panel and/or the display is secure. A lock, such as a spring pin lock for example, on the rear of the fascia is disengaged allowing the display to be moved. The display is moved away from the touch panel. In an example embodiment, the display is rotatably attached to the rear of the fascia and is rotated away from the touch screen panel. This provides access to the rear of the touch panel and the display, allowing for the rear of the touch panel and/or display to be cleaned.

Figure 2:
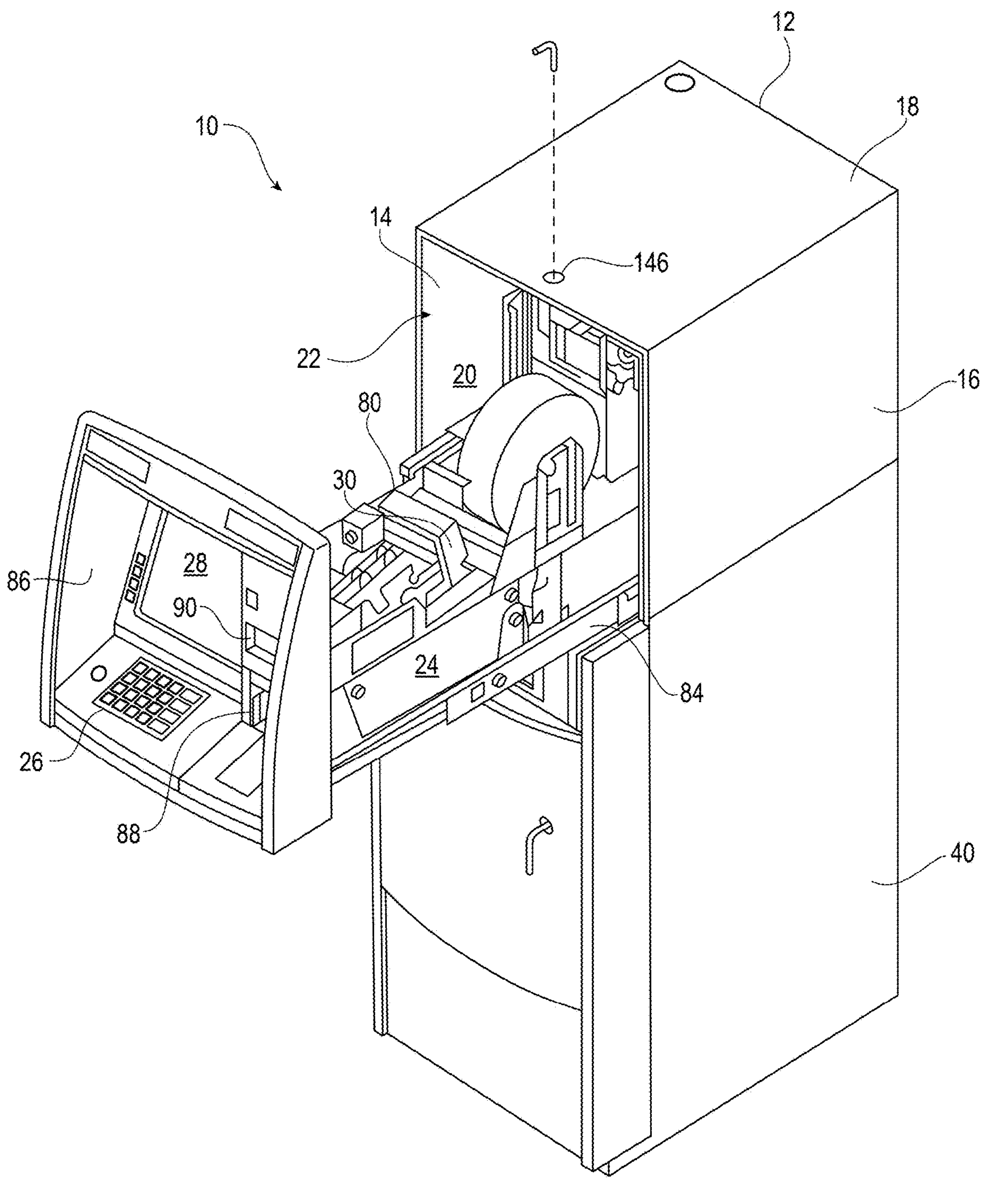
FIG. 2 is a perspective view of an automated banking machine with the upper fascia in an extended position.

With reference to FIGS. 1 and 2, there is illustrated an example of an automated banking machine 10, for example an automated teller machine (ATM). As those skilled in the art can readily appreciate, the type of automated banking machine 10 illustrated in this example was selected merely for ease of illustration and that the techniques presented herein can be employed on other types of automated banking machines and/or other types of devices with touch screen displays.

The automated banking machine 10 comprises a top housing 12 having side walls 14 and 16, and top wall 18. Housing 12 encloses an interior area indicated 20. Housing 12 has a front opening 22. In an example embodiment, the rear of housing 12 is closed by a rear wall 19. However, in other embodiments, the rear of housing 12 may be accessible through an access door or similar device. Top housing 12 is used to house certain banking machine components such as input and output devices.

In an example embodiment, the automated banking machine 10 also includes output devices providing outputs to the customer. In an example embodiment, the automated banking machine 10 includes a touch screen display 28. The touch screen display 28 is capable of providing outputs to a user as well as receiving inputs. As will be described herein, infra, the touch screen display 28 comprises a touch panel that is layered over a display. In particular embodiments, the touch panel comprises a hardened, vandal resistant glass.

Examples of vandal resistant glass includes glass defined by international standard IEC 62262 (2002) or the equivalent European standard, EN 62262.

In an example embodiment, the automated banking machine comprises a lower fascia 110. The lower fascia 110 operates to cover a chest 40. In this embodiment, the lower fascia 110 includes a front face 112 and first and second side extensions 114, 116, respectively. In particular embodiments, the automated banking machine 10 further comprises a lower fascia locking mechanism 148 for selectively securing lower fascia 110

Figure 3:
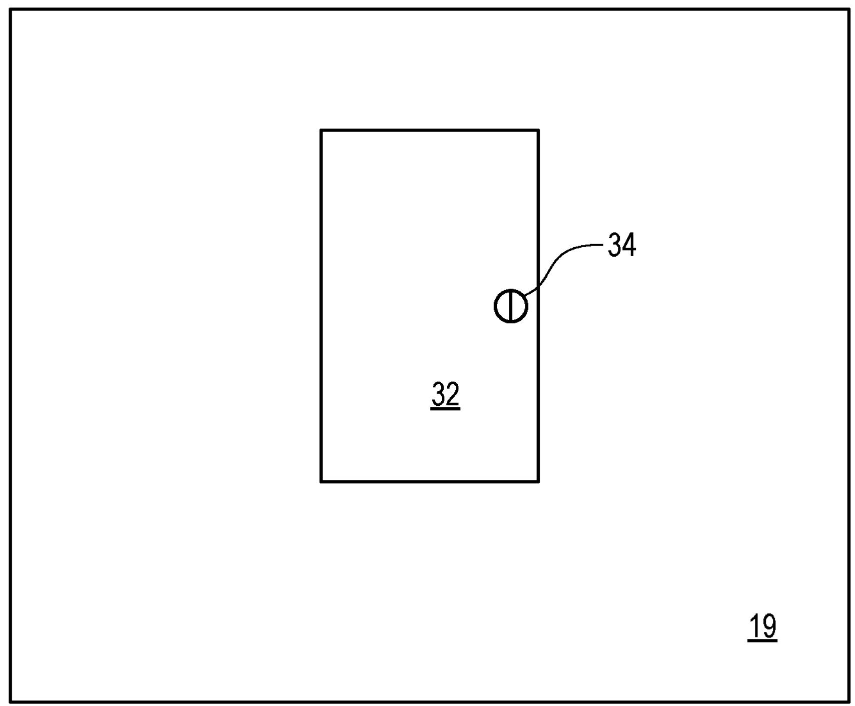
FIG. 3 is a block diagram illustrating an example of a rear panel with an access door for accessing the interior of the housing of an automated banking machine.

In the example illustrated in FIGS. 1-2, the automated banking machine 10 comprises an upper locking mechanism 146 for selectively retaining the rollout tray 80 in the retracted position when upper fascia 86 covers the front opening 22. Those skilled in the art should readily appreciate that other suitable techniques may be employed to open or access the upper fascia 86, e.g., move the upper fascia 86 away from the upper housing 12 to provide access to the rear of the upper fascia 86. For example, access may be provided through a rear door 32 on rear panel 19 (see e.g. FIG. 3). In an example embodiment, as illustrated in FIG. 3, the rear door 32 comprises a locking mechanism 34.

With reference to FIG. 2, in this example embodiment, the automated banking machine 10 further includes a rollout tray 80. Rollout tray 80 is movably mounted in supporting connection with slides 84. The slides 84 enable movement of the rollout tray 80 between the extended (or open) position that is shown in FIG. 2 and a retracted position within the interior area 20 of the top housing 12. The rollout tray 80 in this example embodiment may be similar to that shown in U.S. Pat. No. 6,082,616, the entire disclosure of which is incorporated by reference herein.

The rollout tray 80 may have several upper banking machine components supported thereon including card reader 24, input keys 26, display 28, receipt printer 30, and other components as appropriate for the particular automated banking machine 10.

In an example embodiment, the upper fascia 86 is in supporting connection with rollout tray 80. The upper fascia 86 may include user interface openings such as a card opening 88 through which a customer operating the machine 10 may insert a credit, debit or other card, or a receipt delivery slot 90 through which printed transactions receipts may be delivered to the customer. The rollout tray 80 movably supports upper fascia 86 relative to the top housing 12 so that upper fascia 86 is movable between a first position covering the front opening and a second position in which the upper fascia is disposed from the front opening 22.

As illustrated in FIG. 1, in the operative condition of the automated banking machine 10, the rollout tray 80 is retracted into the interior area 20 of the housing 12. The upper fascia 86 operates to close front opening 22 and allows a customer to input information and receive outputs from the machine 10.

Figure 4:
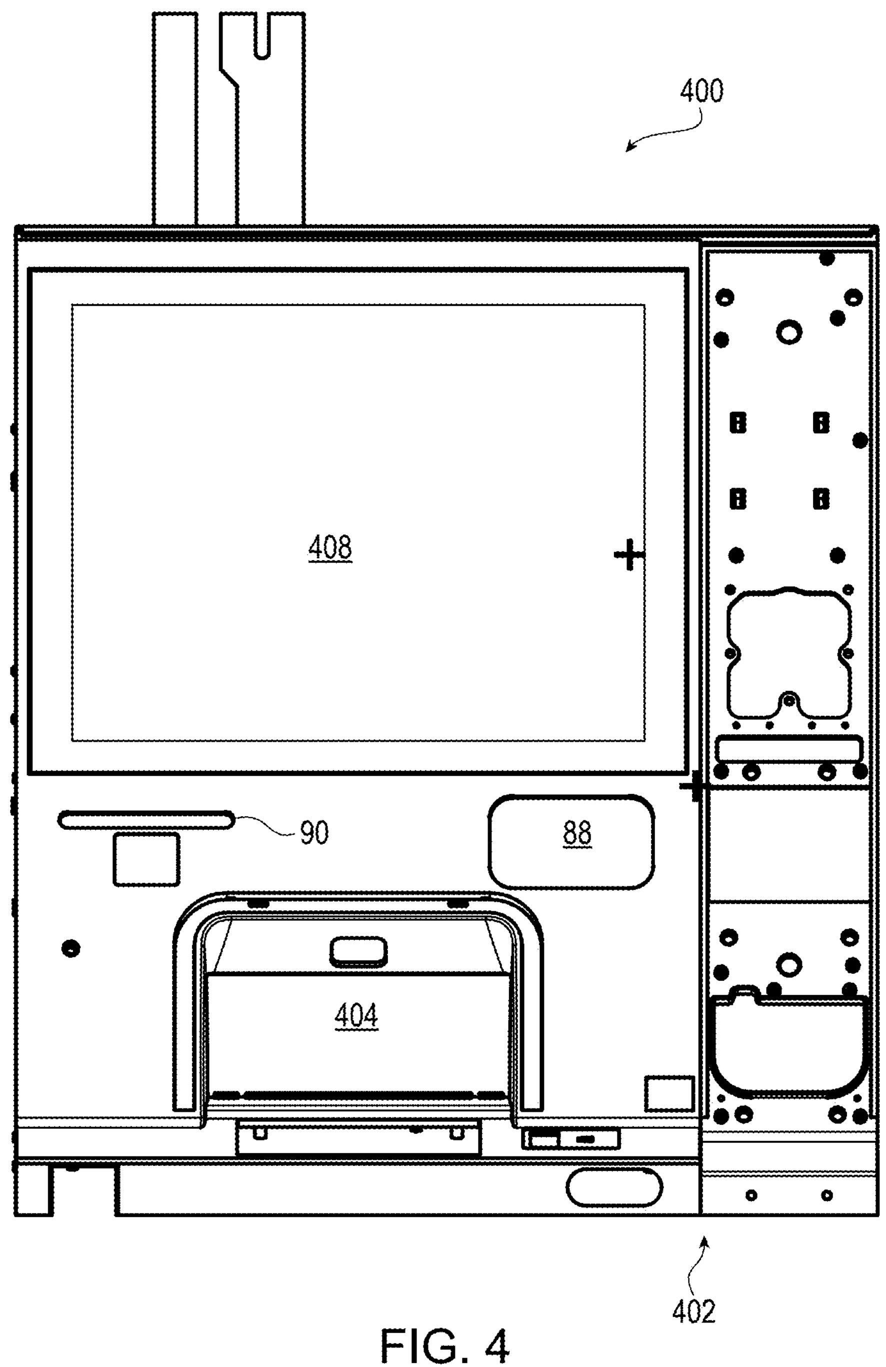
FIG. 4 illustrates an example of a view of the front of an upper fascia of a second embodiment.

FIG. 4 illustrates an example of a view of the front 402 of an upper fascia 400 of a second embodiment. The upper fascia 400 comprises a cash cove 404 that is coupled with a cash dispenser (not shown) where a user can retrieve cash from the automated transaction machine. In an example embodiment, the upper fascia 400 further comprises a card opening 88 that is coupled with a card reader (not shown) that allows a user to insert and retrieve a card used for performing transactions with an automated banking machine. In still yet another embodiment, the upper fascia 402 comprises a receipt printer slot 90 that is coupled with a receipt printer (not shown) for providing a receipt to a user. The upper fascia 400 comprises a touch panel 408. As will be described in more detail herein, the touch panel 408 overlies a display (see e.g., FIG. 5) which provides information to a user while the user can employ the touch panel 408 to provide inputs for performing a financial transaction with an automated banking machine.

Figure 5:
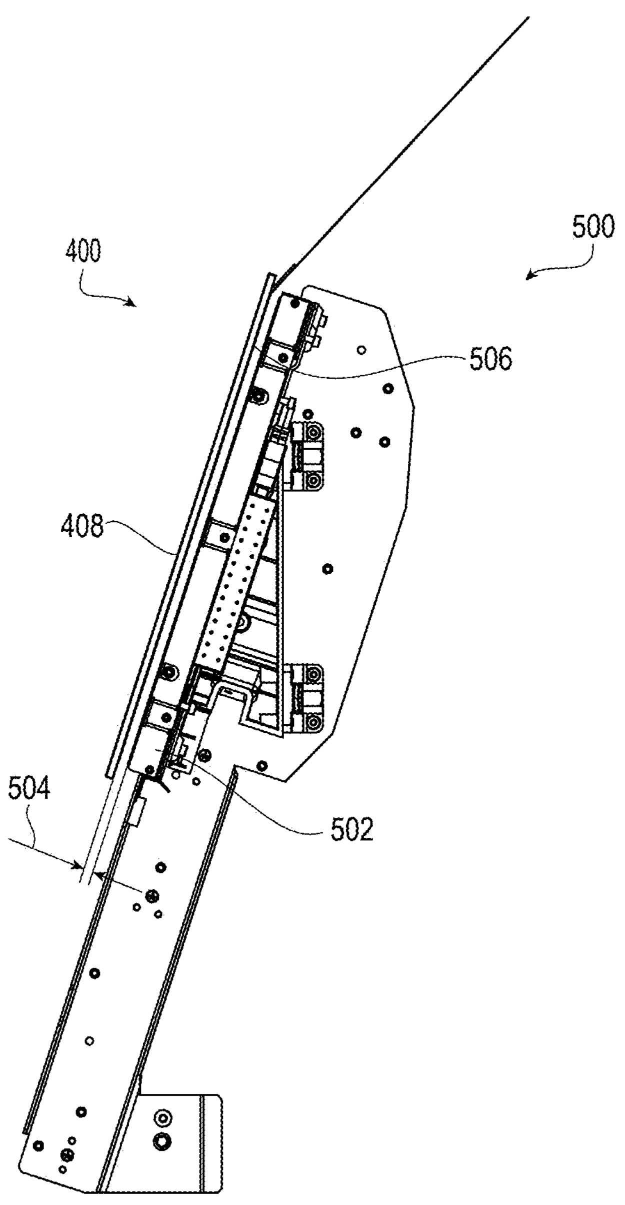
FIG. 5 illustrates an example of a side view of the fascia for the second embodiment.

FIG. 5 illustrates an example of a side view 500 of the fascia 400 for the second embodiment. This view illustrates that the touch panel 408 overlies the display 502. In an example embodiment, the rear surface 506 of touch panel 408 and a display surface 503 of the display 502 abut against each other. In other example embodiments, as illustrated in FIG. 5, there is a gap 504 between the touch panel 408 and the display surface 503 of the display 502.

Figure 6:
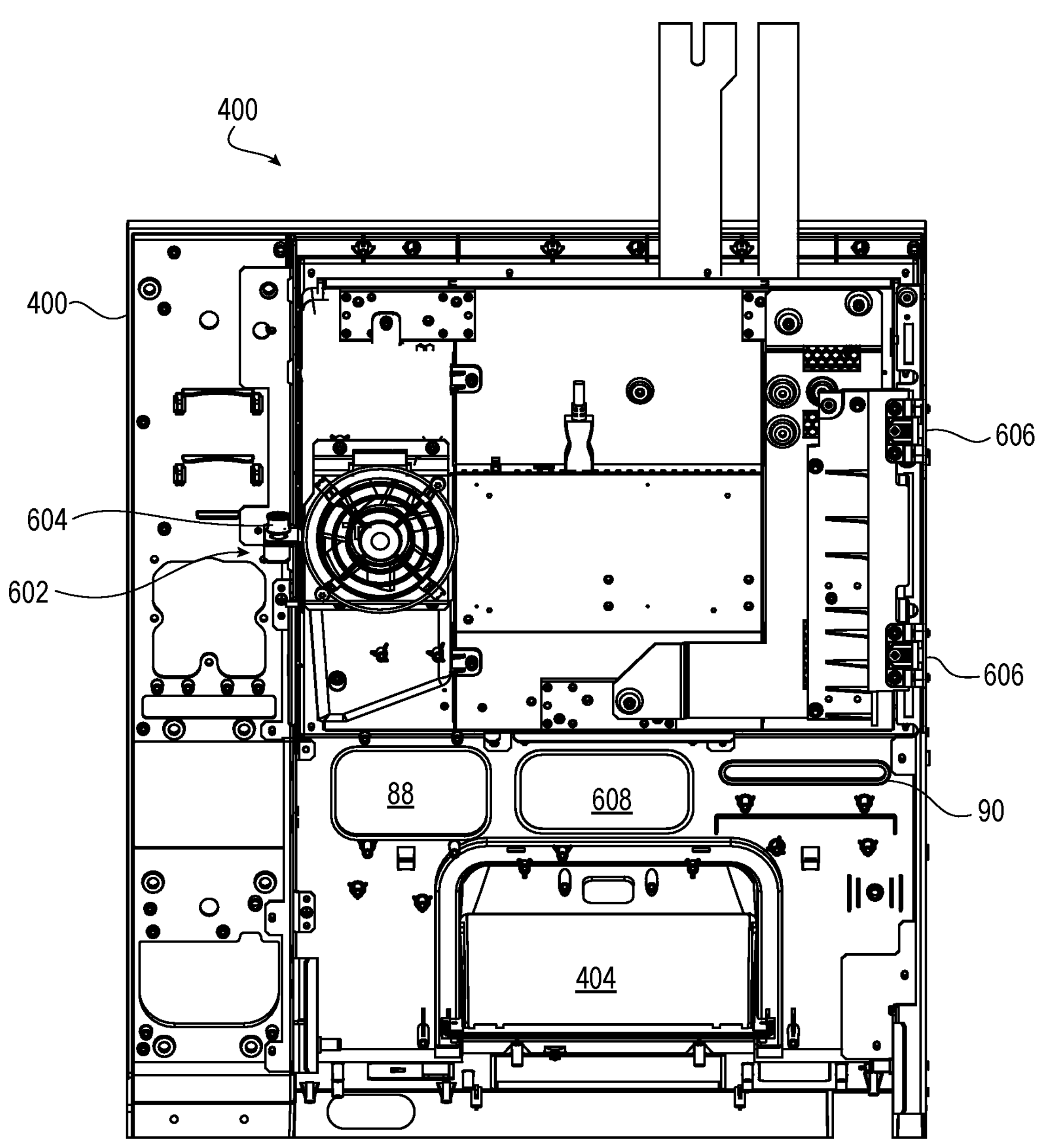
FIG. 6 illustrates an example of a rear side of the fascia for the second embodiment.

FIG. 6 illustrates an example of a rear side 600 of the fascia 400 for the second embodiment. The display, in the closed position as illustrated, is held in place by latch 602, pin lock 604, and hinges 606.

In an example embodiment, the in lock 604 is spring pin lock that is biased holding the lock in a position to engage the latch 602. The spring pin lock 604 is moved away from latch 602 to allow the display 502 to rotate about hinges 606 to move away from the rear 600 of the fascia 400 as will be illustrated herein.'

In an example embodiment, as illustrated in FIG. 6, the fascia 400 a deposit opening 608. The opening 608 can allow a user to deposit checks and/or cash into the automated transaction machine.

Figure 7:
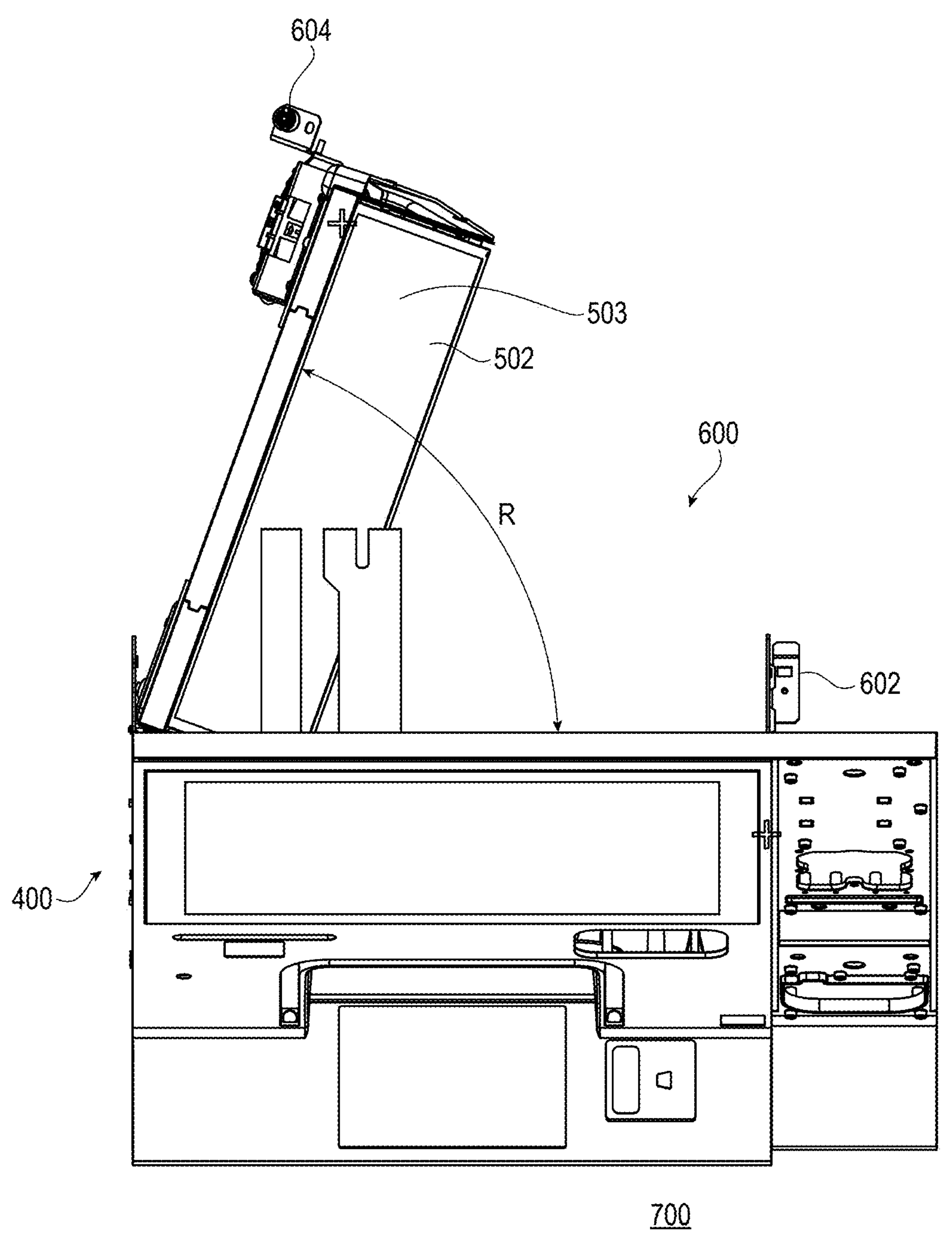
FIG. 7 illustrates an example of a top view of the display rotated away from the fascia for the second embodiment.

FIG. 7 illustrates an example of a top view 700 of a display 502 rotated away from the fascia 400 of the second embodiment. In the illustrated example, after the pin lock 604 is disengaged from the latch 602, the display 502 is rotated in the direction R away from the rear side 600 of the fascia 400. This allows access to the surface of the display 502 and is will be further illustrated herein infra, the rear surface 506 of the touch panel 408.

Figure 8:
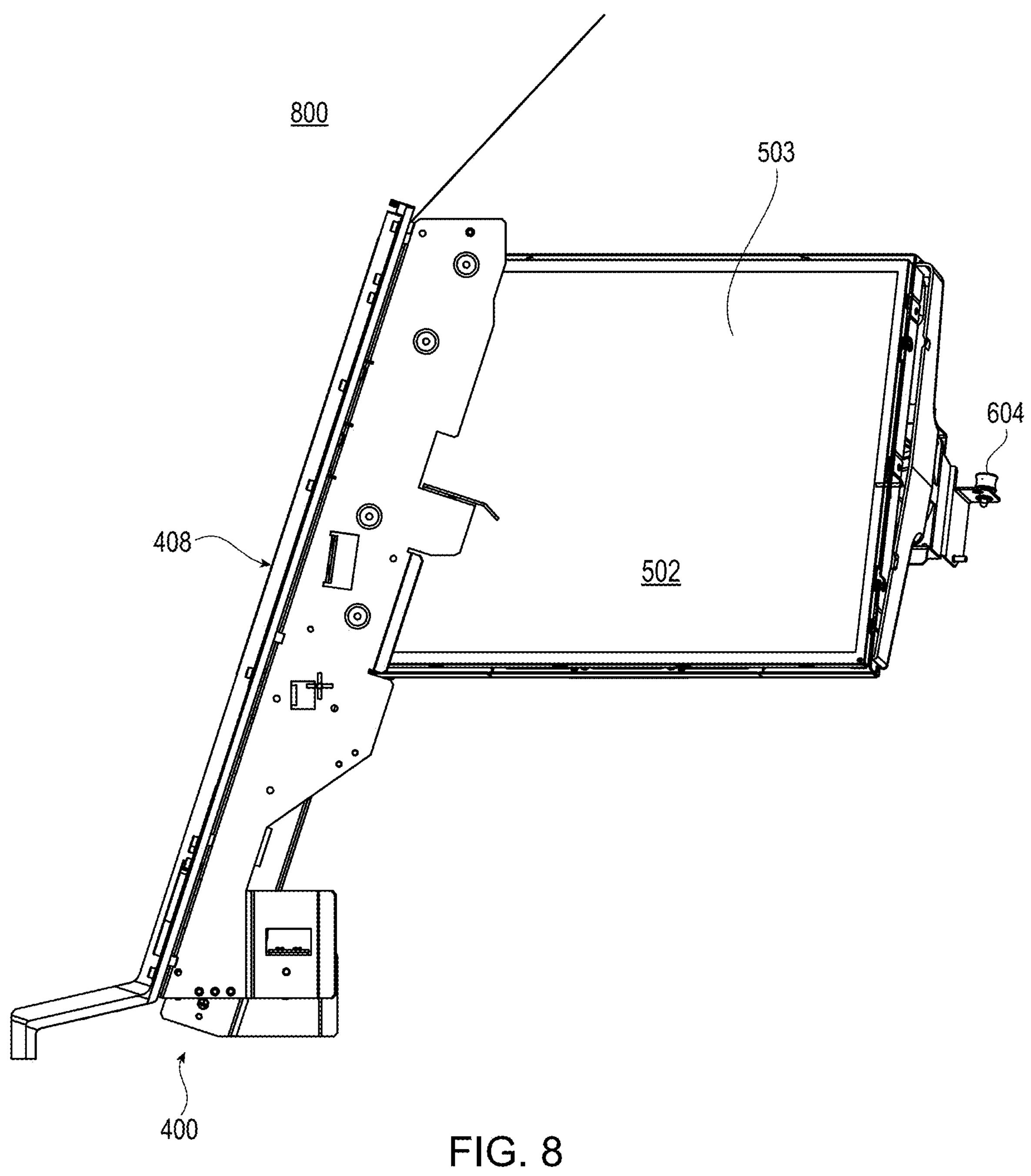
FIG. 8 illustrates an example of a first side view of the display rotated away from the fascia for the second embodiment.
Figure 9:
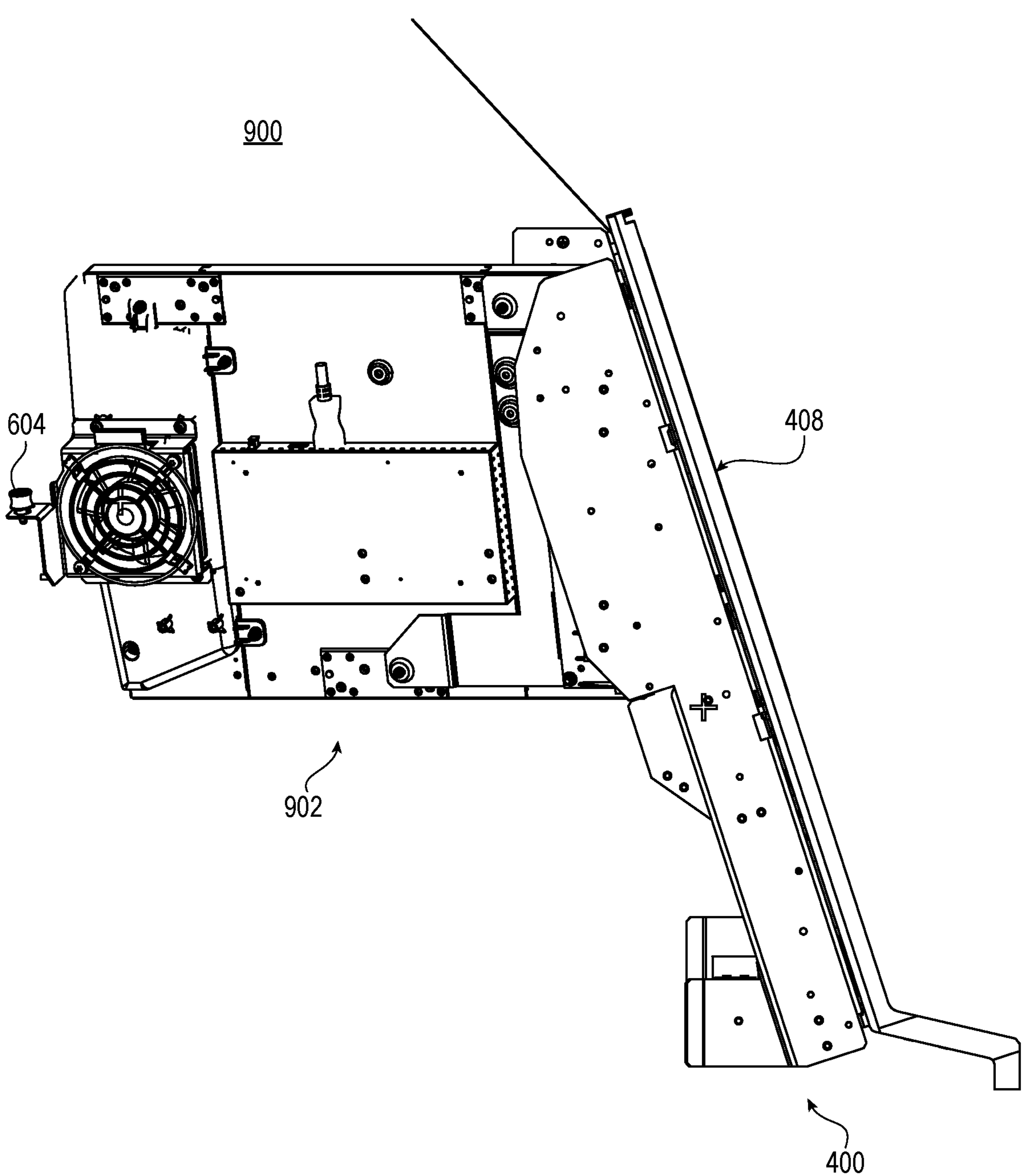
FIG. 9 illustrates an example of a second side view of a display rotated away from the fascia for the second embodiment.

FIG. 8 illustrates an example of a first side 800 of the fascia 400 with the display 502 rotated away from the fascia. FIG. 9 illustrates a second side 900 of the fascia 400 with the display 502 rotated away from the fascia 400. FIG. 9 further illustrates the rear side 902 of the display 502 rotated away from the fascia 400.

Figure 10:
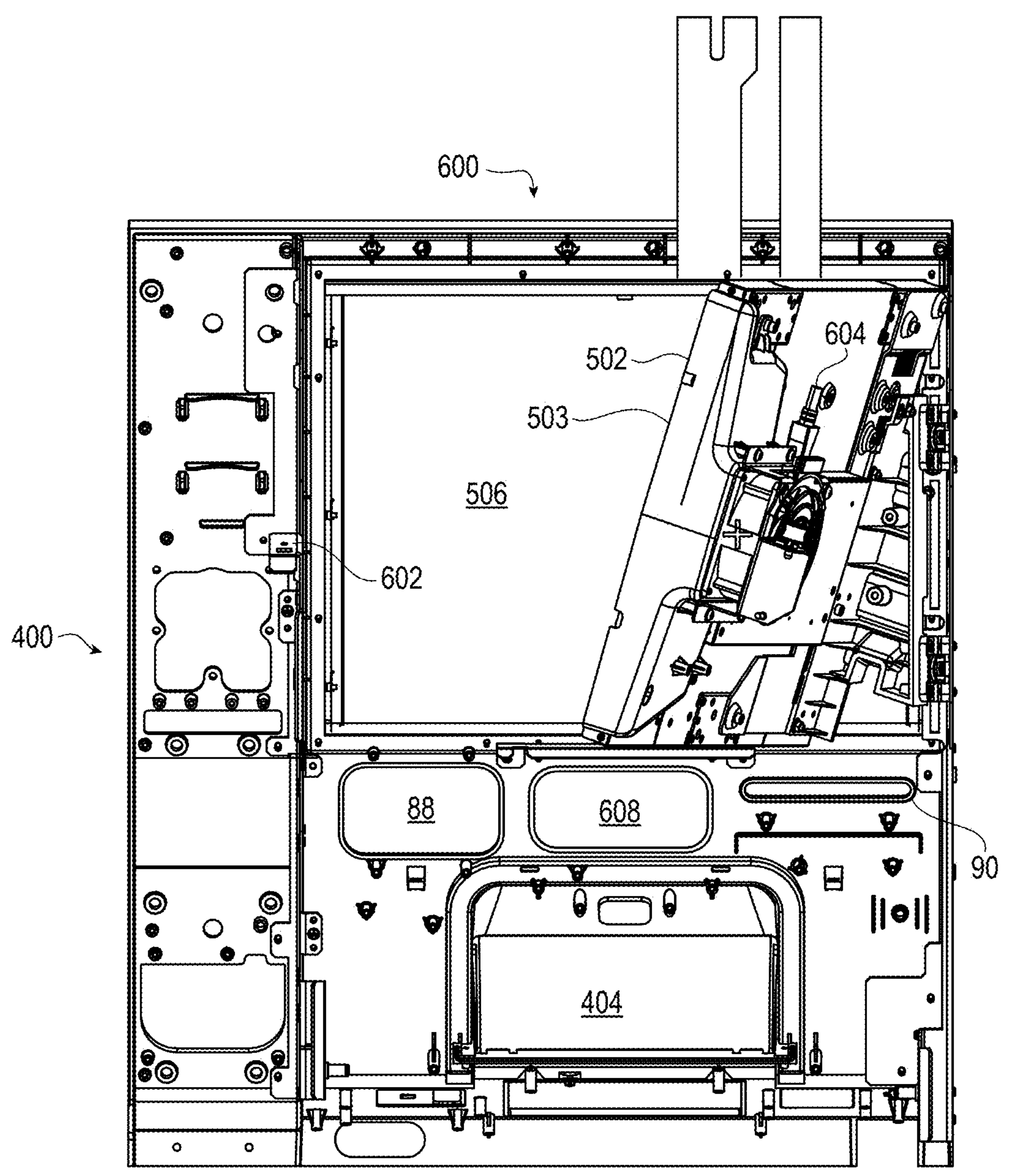
FIG. 10 illustrates an example of the rear side of the fascia with the display rotated away from the fascia that provides access to the rear side of the touch panel and the display for cleaning.

FIG. 10 illustrates an example of the rear side 600 of the fascia 400 with the display 502 rotated away from the fascia 400 that provides access to the rear side 506 of the touch panel 408 and the display surface 503 of the display 502 for cleaning. Upon completion, the display 502 is rotated in a direction opposite of R (FIG. 7) to the closed position. Pin lock 604 engages latch 602 to retain the display 502 in the closed position.

Figure 11:
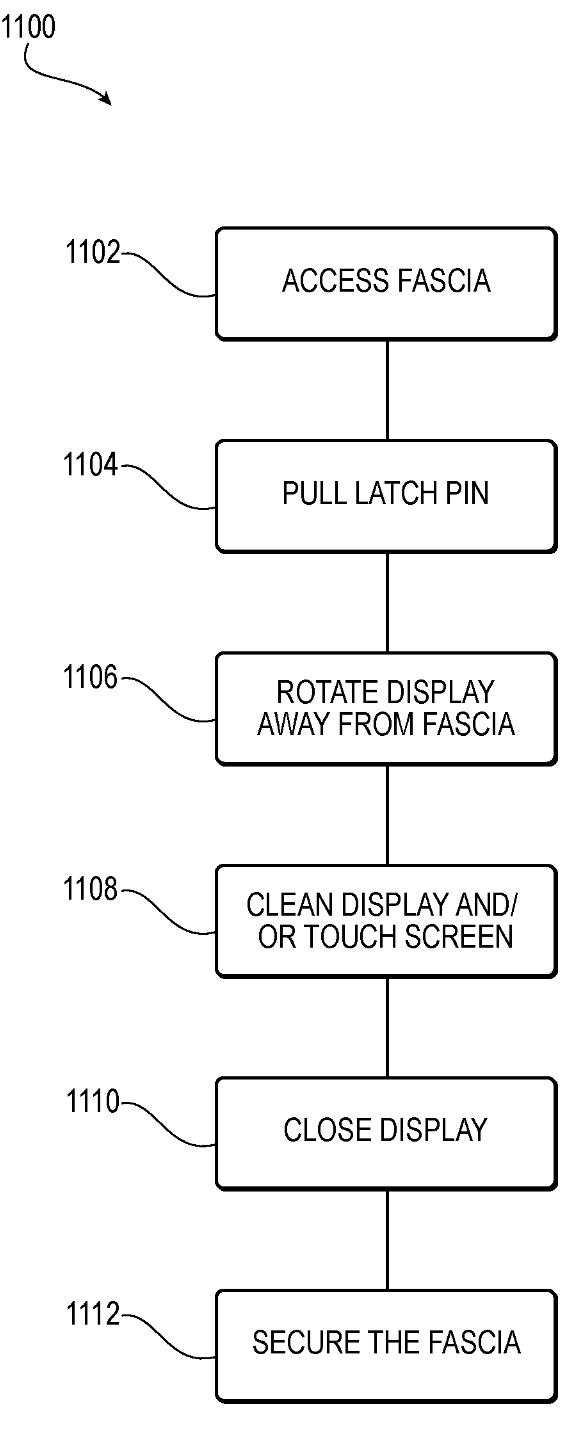
FIG. 11 is a block diagram illustrating an example of a method for cleaning a touch screen.

In view of the foregoing structural and functional features described above, a methodology 1100 in accordance with an example embodiment will be better appreciated with reference to FIG. 11. While, for purposes of simplicity of explanation, the methodology 1100 of FIG. 11 is shown and described as executing serially, it is to be understood and appreciated that the example embodiment is not limited by the illustrated order, as some aspects could occur in different orders and/or concurrently with other aspects from that shown and described herein. Moreover, in some embodiments, not all illustrated features may be required.

At 1102, the rear portion of the fascia or interior of the housing where the fascia is mounted is accessed. For example, this can be done by unlocking the fascia and sliding it away from the housing as illustrated in FIG. 2. In another example embodiment, this can be done by unlocking an access panel or door (e.g., unlocking lock 34 on door 32 in FIG. 3) to access the rear of the fascia (e.g., rear 600 of fascia 400 in FIG. 6). In particular embodiments, the top housing 12 is removed from the automated banking machine 10.

At 1104, the latch pin (or pin lock) is disengaged from the latch (e.g., pin lock 604 is disengaged from latch 602). In an example embodiment, the latch pin is pulled away from the latch. In an example embodiment, the latch pin, or pin lock, is biased to engage the latch when no force is applied.

At 1106, the display is rotated in a first direction away from the fascia. For example as illustrated in FIGS. 6 and 7, the display 502 is attached to the rear 600 of the fascia 400 by hinges 606 so that the display 502 can be rotated in direction R away from the fascia, providing access to the rear 506 of the touch panel 408 and to the display surface 503 of the display 502.

At 1108, the desired surfaces are cleaned. For example, the rear surface 506 of the touch panel 506 and/or the display surface 503 of the display 502 (see e.g., FIG. 5 or 10) can be cleaned. Any suitable technique can be employed for cleaning the surfaces.

At 1110, the display is closed. For example, the display can be rotated in a second direction opposite to the first direction R illustrated in FIG. 7. Upon rotating the display in the second direction to the closed position, the display is secured. For example, the pin latch (e.g. spring pin 604) engages the latch (e.g. latch 602) as illustrated in FIG. 6.

At 1112, the fascia is secured. For example, if the fascia is mounted on a rollout tray, the rollout tray is returned to the closed position and the fascia is locked. If an access panel or door was employed to access the rear of the fascia, the door is closed and locked (e.g., door 32 and lock 34 in FIG. 3). In particular embodiments, if the top housing 12 was removed, the top housing is mounted onto the automated transaction machine 10 and secured.

Although the above description describes cleaning a display for an automated banking machine, those skilled in the art can readily appreciate that the method described herein can be employed to clear the surfaces between the display and the touch screen of any type of device where access to the interior of the device is limited. Thus, the features described herein should not be construed as being limited solely to automated banking machines.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A method comprising:
- disengaging a latch coupling a display with a fascia having a touch panel mounted thereon;
- rotating the display relative to the fascia in a first direction whereby a display surface of the display confronts a rear surface of the touch panel and are moved away from one another during said rotating; and
- cleaning one of the rear surface of the touch panel and the display surface of the display.

2. The method according to claim 1 further comprising:
- rotating the display relative to the fascia in a second direction opposite to the first direction; and
- engaging the latch and thereby preventing rotation of the display relative to the fascia.

3. The method according to claim 1 further comprising:
- forming the touch panel of vandal resistant glass.

4. The method according to claim 1 further comprising:
- engaging the latch with a spring biased pin lock and thereby preventing rotation of the display relative to the fascia.

5. The method according to claim 1 wherein said cleaning is further defined as:
- cleaning the rear surface of the touch panel.

6. The method according to claim 1 wherein said cleaning is further defined as:
- cleaning the display surface of the display.

7. The method according to claim 1 wherein said cleaning is further defined as:
- cleaning both the rear surface of the touch panel and the display surface of the display.

8. The method according to claim 1 further comprising:
- arranging the fascia in supporting connection with a rollout tray wherein the rollout tray is employed to extend the fascia away from a housing to and thereby provide access to the latch.

9. The method of claim 1 further comprising:
- attaching the display to the fascia with at least one hinge for said rotating the display.

10. The method according to claim 8 further comprising:
- engaging the latch with a spring biased pin lock and thereby preventing rotation of the display relative to the fascia; and
- wherein said disengaging further comprises moving the spring biased pin lock to disengage the latch.

11. The method according to claim 8 further comprising:
- unlocking a locking mechanism to allow the rollout tray to move relative to the housing whereby the fascia is also extended away from the housing.

12. An apparatus comprising:
- a housing;
- a fascia mounted to said housing;
- a touch panel mounted on said fascia;
- a display coupled with said fascia;
- a latch that when engaged holds said display against said fascia;
- a hinge rotatably coupling said display to said fascia;
- wherein while said latch is disengaged, said display is rotatable away from said touch panel enabling access to a rear surface of the touch panel and to a display surface of the display.

13. The apparatus according to claim 12 wherein the touch panel comprises vandal resistant glass.

14. The apparatus according to claim 12 further comprising:
- a spring biased pin lock wherein said latch is engaged with said spring biased pin lock when engaged to prevent rotation of said display.

15. The apparatus according to claim 12 further comprising:
- a rollout tray wherein said fascia is in supporting connection with said rollout tray is employed to extend the fascia away from said housing to provide access to said latch.

16. The apparatus according to claim 12 further comprising:
- an access panel mounted on an opposite side of said housing as said fascia;
- a lock coupled to said access panel;

wherein access to said latch is provided via said access panel when said lock is in an unlocked state.

17. The apparatus according to claim 12 further comprising:

a cash cove mounted on said fascia.

18. The apparatus according to claim 17 further comprising:

a card opening mounted on said fascia.

19. The apparatus according to claim 18 further comprising:

a receipt delivery slot mounted on said fascia.

20. The apparatus according to claim 19 further comprising:

a lower fascia coupled with said housing below said fascia, wherein access to said lower fascia is separate and independent from access to said fascia.

* * * * *